No. 635,268. Patented Oct. 17, 1899.
E. A. OSSE.
PLANISPHERE.
(Application filed Mar. 24, 1899.)

(No Model.) 2 Sheets—Sheet 1.

WITNESSES:
Chas E. Walsh
Wm B. Oram

INVENTOR
EDWARD A. OSSE,

No. 635,268.  
E. A. OSSE.  
PLANISPHERE.  
(Application filed Mar. 24, 1899.)  
Patented Oct. 17, 1899.

(No Model.) 2 Sheets—Sheet 2.

WITNESSES:
Chas. E. Walsh
Wm. B. Oram

INVENTOR
EDWARD A. OSSE.

UNITED STATES PATENT OFFICE.

EDWARD A. OSSE, OF BALTIMORE, MARYLAND.

PLANISPHERE.

SPECIFICATION forming part of Letters Patent No. 635,268, dated October 17, 1899.

Application filed March 24, 1899. Serial No. 710,398. (No model.)

*To all whom it may concern:*

Be it known that I, EDWARD A. OSSE, of Baltimore city, State of Maryland, have invented a new and useful Planisphere, of which the following is a specification.

My invention relates to a planisphere or globe of the earth by means of which the corresponding time of day and the day of the week of any two or more places thereon may be readily found.

It is customary for mariners to change their date in crossing the one hundred and eightieth meridian of longitude, reckoning from the prime meridian, which passes through Greenwich. Ships crossing this meridian from the east skip one day, and vessels crossing from the west count the same day twice. This change not having been made by early discoverers occasioned different time-schedules on some of the islands in the Pacific Ocean. The Philippine Islanders, for instance, held their Sunday on the day that was Monday to the inhabitants of Borneo or Hong Kong. Recent corrections have placed these different countries on the same time basis, thereby conforming the local date-line more to the one hundred and eightieth meridian. Formerly this date-line passed around west of the Philippine Islands and in a northeasterly course and passing east of the Japan Islands, entered the Behring Strait.

I attain the objects of my invention by the mechanism illustrated in the accompanying drawings, in which—

Figure 1:
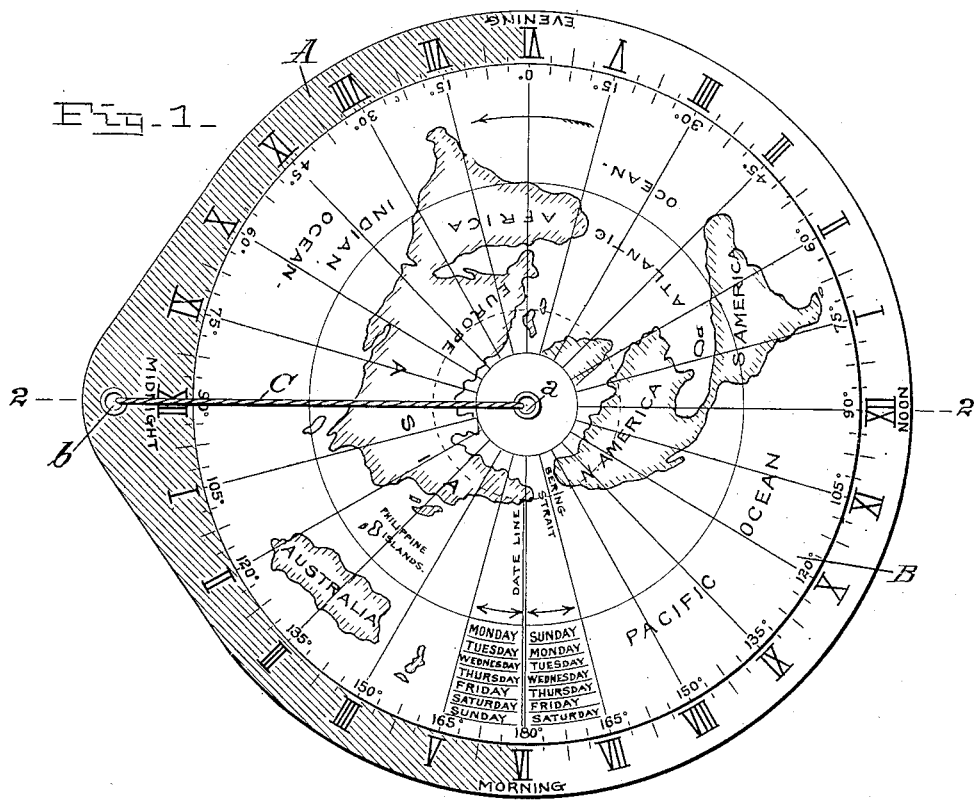
Figure 2:
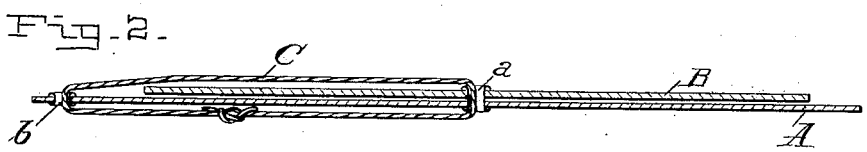
Figure 3:
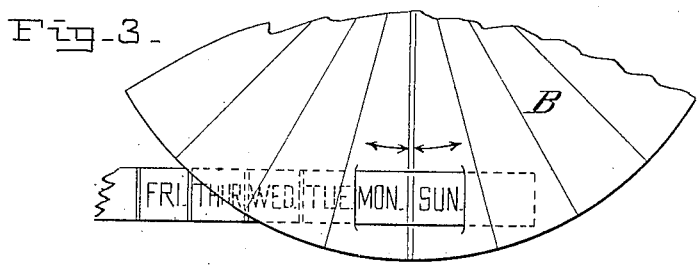
Figure 4:
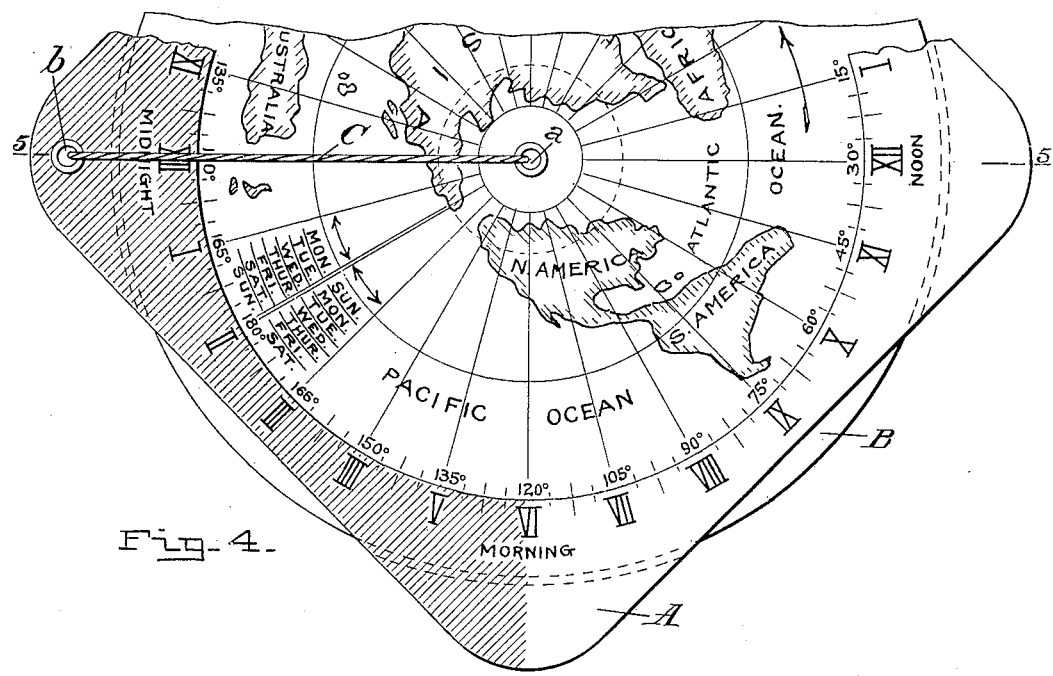
Figure 5:
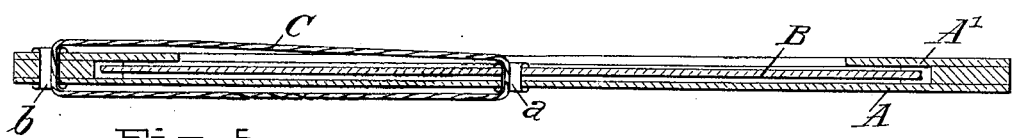
Figure 6:
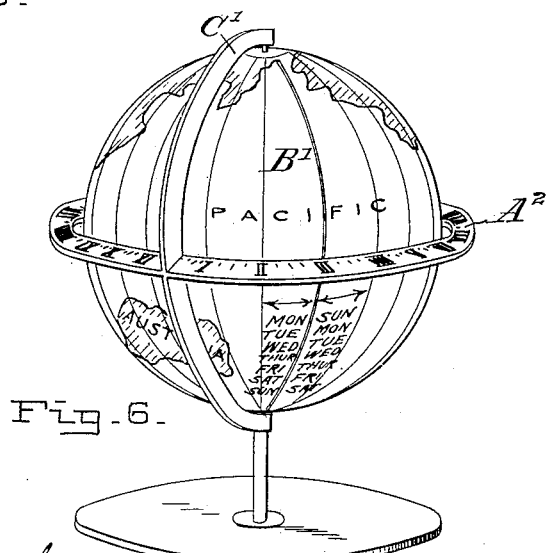

Figure 1 is a plan or top view of the time-ascertaining planisphere. Fig. 2 is a sectional view on the line 2 2. Fig. 3 is a plan view of a fragmentary part of the instrument, showing a modification. Fig. 4 is a modification in mounting the planisphere. Fig. 5 is a sectional view on the line 5 5 of Fig. 4, and Fig. 6 is a view of the invention applied to a globe.

The stationary base A has a circular rim graduated into twenty-four-hour spaces denoted by numerals, and these spaces are divided into half-hours and quarter-hours. Where still greater accuracy is required, subdivisions of minutes or fractions thereof may be used. Mounted upon this stationary time-base is a disk B, pivoted to rotate about the center $a$. Upon this disk B the physical, political, and mathematical divisions of the earth's surface are geographically projected or represented. The periphery of the disk is suitably graduated and has figures showing the various meridians.

The international date-line, as already described, is indicated on the drawings, and to the right-hand side of this line the days of the week are marked, and opposite these, at the left of the line, the corresponding days, being one day later, are marked. From the center $a$, passing through the point on the stationary base marking "midnight," is a division-line or marker C, which I style the "beginning-of-the-day" line. In the construction shown eyelets are used at $a$ and $b$, and a cord represents the said line. A piece of wire or a string of any other material would answer the same purpose. It is not absolutely necessary to use eyelets at the points $a$ and $b$, as rivets or pins could be used instead.

In the modified form shown in Figs. 4 and 5 the disk B is made to rotate between the base A and the upper piece A', upon the surface of which the hours, minutes, &c., are indicated.

By surface-shading that portion of the base A or upper piece A' indicating the time from six p. m. to midnight and then to six a. m. the time of day and time of night are made more apparent. (See Figs. 1 and 4.)

To use the instrument when it is required to find the time, day, or date of any place corresponding to some other place, which, for illustration, may be called "O," it is only necessary to bring the meridian passing through the place O opposite the time indicated on the base A or A'. The time of any other place will be opposite the latter's meridian.

To find the day of the week, all the area to the left of the beginning-of-the-day line C, going in an opposite direction to that taken by the hands of a clock, up to the date-line on the disk B will be represented by a day found in the column to the right of the date-line and the day immediately opposite in the column adjoining on the left side of the line will indicate the day that applies to the area from this line, continuing in an opposite direction to that taken by the hands of a clock around to the beginning-of-the-day line.

I am aware that prior to my invention planispheres, globes, time-charts, and machines for calculating time have been made; but I have invented a novel combination that has an operation different from any other and which provides an aggregate of results not produced by any other.

The elements of my invention are also applicable to a globe, as shown in Fig. 6. The stationary time-base $A^2$ in this case consists of a circular ring, with numerals on it denoting twenty-four hours. The globe $B'$ is the equivalent of the disk in the planisphere and has the date-line and the two adjoining columns denoting the days of the week, and the beginning-of-the-day line is here denoted by the stationary segment-shaped bar $C'$.

Having thus described my invention, what I claim as new, and desire to secure by Letters Patent, is—

The combination in a planisphere, or an equivalent device, of a stationary circular-rim time-base provided with figures indicating the twenty-four hours of the day; a map of the world revoluble in the said circular rim, and provided with an international date-line having corresponding days of the week indicated on both sides of this line; and a stationary marker representing the beginning-of-the-day line extending from the center of the revoluble map of the world to the said stationary circular rim.

EDWARD A. OSSE.

Witnesses:
CHAS. E. WALSH,
THOS. C. BAILEY.